(12) United States Patent (10) Patent No.: US 12,669,716 B2

Xu et al. (45) Date of Patent: Jun. 30, 2026

(54) OPTICAL IMAGE STABILIZATION DEVICE AND OPTICAL DEVICE

(71) Applicant: Changzhou AAC Raytech Optronics Co., Ltd., Changzhou City (CN)

(72) Inventors: Tongming Xu, Changzhou (CN); Suohe Wei, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 302 days.

(21) Appl. No.: 18/404,812

(22) Filed: Jan. 4, 2024

(65) Prior Publication Data

US 2025/0093674 A1 Mar. 20, 2025

Related U.S. Application Data

(63) Continuation of application No. PCT/CN2023/119874, filed on Sep. 20, 2023.

(51) Int. Cl.
*G02B 27/64* (2006.01)
*G02B 7/04* (2021.01)

(52) U.S. Cl.
CPC ............. *G02B 27/646* (2013.01); *G02B 7/04* (2013.01)

(58) Field of Classification Search
None
See application file for complete search history.

(56) References Cited

U.S. PATENT DOCUMENTS

| | | | | |
|---|---|---|---|---|
| 2014/0098421 A1* | 4/2014 | Umezu | ................ | G02B 27/646 |
| | | | | 359/554 |
| 2015/0146025 A1* | 5/2015 | Bang | ......................... | G02B 7/08 |
| | | | | 348/208.99 |
| 2016/0161757 A1* | 6/2016 | Hee | ...................... | G02B 27/646 |
| | | | | 359/557 |
| 2020/0249424 A1* | 8/2020 | Ho | ...................... | H02K 41/0356 |
| 2021/0199917 A1* | 7/2021 | Jung | ........................ | G03B 3/10 |
| 2022/0113553 A1* | 4/2022 | Yeo | ........................... | G03B 3/10 |
| 2024/0176097 A1* | 5/2024 | Kwon | ...................... | G02B 7/08 |
| 2025/0208371 A1* | 6/2025 | Que | ....................... | G02B 27/64 |
| 2025/0251644 A1* | 8/2025 | Moon | ................... | H04N 23/68 |

FOREIGN PATENT DOCUMENTS

CN 215813672 U * 2/2022

* cited by examiner

*Primary Examiner* — Derek S. Chapel
(74) *Attorney, Agent, or Firm* — Wiersch Law Group

(57) ABSTRACT

An optical image stabilization device and an optical device. The optical image stabilization device includes a housing, a focusing structure, an elastic connection structure, a driving structure and image stabilization balls. The elastic connection structure is connected between the focusing structure and the housing and enables the focusing structure to have a movement trend toward a first side of the housing. The image stabilization balls are sandwiched between the focusing structure and the first side due to the movement trend. The driving structure drives the focusing structure to move and simultaneously roll the image stabilization balls, such that the focusing structure moves in a direction perpendicular to the optical axis under guidance of the image stabilization balls. By providing the image stabilization balls, the focusing structure is not easy to tilt and the optical image stabilization device has a simple and compact structure, reducing the production cost.

11 Claims, 11 Drawing Sheets

OPTICAL IMAGE STABILIZATION DEVICE AND OPTICAL DEVICE

CROSS-REFERENCE TO RELATED APPLICATIONS

This application is a continuation of International Application No. PCT/CN2023/119874, filed on Sep. 20, 2023, which is hereby incorporated by reference in its entirety.

TECHNICAL FIELD

The present disclosure relates to the technical field of lenses, and in particular, to an optical image stabilization device and an optical device.

BACKGROUND

Imaging devices are commonly used in cameras and portable electronic apparatus such as mobile phones, tablets and notebooks. A lens module of the camera device generally has an Auto Focusing (AF) function and an Optical Image Stabilization (OIS) function. When the lens module implements the optical image stabilization function, the image stabilization device needs to be used to drive the lens to move along an optical axis direction perpendicular to the lens.

An existing image stabilization device usually includes a base, a focusing structure and a driving structure. Generally, four elastic sheets are required, and the four elastic sheets connect four corners of the focusing structure to the base, respectively. The driving structure can provide an ampere force to drive the focusing structure to move in a direction perpendicular to the optical axis. However, in the related art, only four elastic sheets are used to connect the focusing structure to the base, in this case, when the ampere force is applied to drive the focusing structure, the focusing structure is easy to tilt, resulting in inaccurate stabilization.

In view of the above defects, an image stabilization assembly is provided between the focusing structure and the base in the related art, and the image stabilization assembly has a function of supporting the focusing structure, so that the focusing structure is not easy to tilt when moving. However, an image stabilization structure in the related art has a relatively complicated structure. As a result, after the image stabilization structure is added, although the focusing structure can be prevented from tilting, a volume of the image stabilization device is increased, resulting in an increased space occupied by the image stabilization device and increased cost for manufacturing the image stabilization device.

SUMMARY

In view of this, the present disclosure provides an optical image stabilization device and an optical device with a compact structure.

An embodiment of the present disclosure provides an optical image stabilization device, applicable to a lens having an optical axis and including: a housing having a mounting space; a focusing structure provided in the mounting space; an elastic connection structure connected between the focusing structure and the housing and configured to enable the focusing structure to have a movement trend toward a first side of the housing in a direction of the optical axis in a free state; image stabilization balls provided between the focusing structure and the first side of the housing, the image stabilization balls being sandwiched between the focusing structure and the first side of the housing due to the movement trend, and the image stabilization balls being capable of rolling in a plane perpendicular to the optical axis under an external force; and a driving structure provided at the focusing structure and the housing and configured to generate a driving force between the focusing structure and the housing to drive the focusing structure to move and simultaneously make the image stabilization balls roll, in such a manner that the focusing structure moves in a direction perpendicular to the optical axis under a guidance of the image stabilization balls.

As an improvement, the housing includes an upper cover and a base detachably connected to each other, the mounting space is enclosed by the upper cover and the base, the focusing structure is connected to the base through an elastic sheet, a gap is formed between the focusing structure and the base, and the image stabilization balls are located between the focusing structure and the base.

As an improvement, an end of the focusing structure facing the base is provided with first bearing platforms spaced from one another, an end of each of the first bearing platforms facing the base is provided with a first rolling groove, an end of the base facing the focusing structure is provided with a second bearing platform at a position corresponding to each of the first bearing platforms, the second bearing platform is provided with a second rolling groove at a position corresponding to each of the first rolling grooves, to form a limiting space between each of the first bearing platforms and each of the second bearing platforms, and each of the image stabilization balls is arranged in the limiting space.

As an improvement, the driving structure includes shared magnets arranged in the focusing structure, a main board is arranged at the base, and the main board is connected to an image stabilization coil at a position corresponding to each of the shared magnets.

As an improvement, the focusing structure includes a bracket and a lens barrel, the bracket includes a through-hole, the lens barrel is movably disposed in the through-hole along the direction of the optical axis, the elastic sheet includes an upper elastic sheet and a lower elastic sheet arranged at two opposite sides of the focusing structure in the direction of the optical axis, a partial structure of the upper elastic sheet is connected to each of the base, the bracket, and the lens barrel, and the lower elastic sheet is connected to the bracket and the lens barrel.

As an improvement, the upper elastic sheet includes a first upper connecting part, a second upper connecting part and a third upper connecting part. The first upper connecting part and the second upper connecting part are connected to each other through a first bending part, the second upper connecting part and the third upper connecting part are connected to each other through a second bending part, the bracket is provided with a first connecting pin, the lens barrel is provided with a second connecting pin, the second upper connecting part and the third upper connecting part are connected to the first connecting pin and the second connecting pin, and the first upper connecting part is connected to the base.

As an improvement, the lower elastic sheet includes a first lower connecting part and a second lower connecting part. The first lower connecting part and the second lower connecting part are connected to each other through a second bending part, the first lower connecting part is fixedly connected to the bracket, and the second lower connecting part is fixedly connected to the lens barrel.

As an improvement, the elastic sheet includes four upper elastic sheets and four lower elastic sheets, two of the four upper elastic sheets form a group, and the two upper elastic sheets in a same group are connected through a connecting strip to integrally form a whole.

As an improvement, the optical image stabilization device further includes a damping material arranged between the bracket and the lens barrel.

As an improvement, the shared magnets are arranged at an inner wall of the bracket and around the lens barrel, the driving structure includes a driving coil arranged at the lens barrel and facing the shared magnets, the main board is arranged at the base, and the upper elastic sheet is connected to the main board and the driving coil.

As an improvement, a metal piece electrically connected to the main board is embedded in the base, and the upper elastic sheet is welded to the metal piece.

In another aspect, an embodiment of the present disclosure provides an optical device, including an optical image stabilization device. The optical image stabilization device is applicable to a lens having an optical axis and includes: a housing having a mounting space; a focusing structure provided in the mounting space; an elastic connection structure connected between the focusing structure and the housing and configured to enable the focusing structure to have a movement trend toward a first side of the housing in a direction of the optical axis in a free state; image stabilization balls provided between the focusing structure and the first side of the housing, the image stabilization balls being sandwiched between the focusing structure and the first side of the housing due to the movement trend, and the image stabilization balls are capable of rolling in a plane perpendicular to the optical axis under an external force; and a driving structure provided at the focusing structure and the housing and configured to generate a driving force between the focusing structure and the housing to drive the focusing structure to move and simultaneously make the image stabilization balls roll, in such a manner that the focusing structure moves in a direction perpendicular to the optical axis under a guidance of the image stabilization balls.

The embodiments of the present disclosure have the following beneficial effects.

According to the optical image stabilization device and the optical device in the above embodiments, the focusing structure can be connected to the housing by providing the elastic connection structure, and the image stabilization balls are disposed between the focusing structure and the first side of the housing. The elastic connection structure is configured to cause the focusing structure to have a movement trend along the optical axis toward the first side of the housing, and the movement trend can cause the image stabilization balls to be sandwiched between the focusing structure and the housing, so that the focusing structure abuts against the image stabilization balls. When the driving structure drives the focusing structure to move relative to the housing, since the image stabilization balls roll in a plane perpendicular to the optical axis under an external force, the focusing structure can move in the direction perpendicular to the optical axis under the guidance of the image stabilization balls. With cooperation of the elastic connection structure and the image stabilization balls, a moving direction of the focusing structure can be limited, so that the focusing structure is not easy to move along a path not perpendicular to the direction of the optical axis when moving, thereby ensuring that the focusing structure is not easy to tilt when moving, and thus ensuring an image stabilization effect. In addition, by arranging the image stabilization balls between the focusing structure and the housing and cooperating with the elastic connection structure, the focusing structure can be prevented from tilting during the movement the focusing structure, thereby achieving a simple structure with a compact structure of the whole image stabilization device, and reducing the production cost.

BRIEF DESCRIPTION OF DRAWINGS

In order to better illustrate technical solutions in embodiments of the present disclosure, the accompanying drawings used in the embodiments are briefly introduced as follows. It should be noted that the drawings described as follows are merely part of the embodiments of the present disclosure, and other drawings can also be acquired by those skilled in the art without paying creative efforts.

Figure 1:
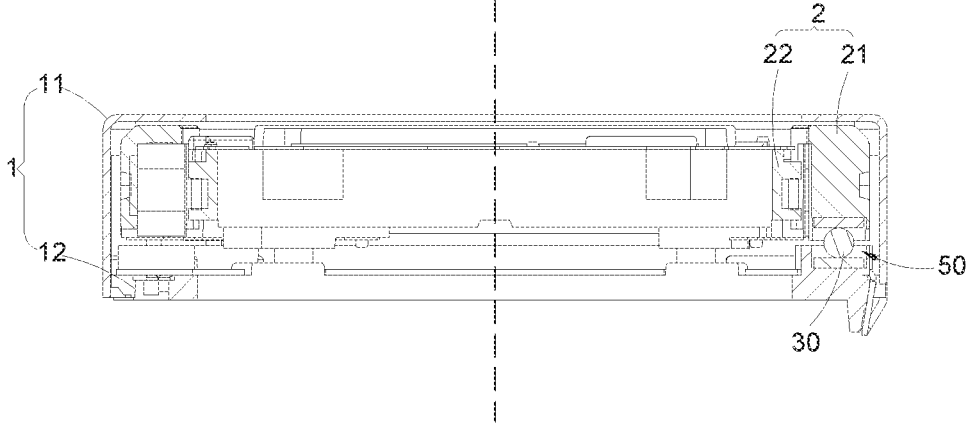
FIG. 1 shows a cross-sectional view of an optical image stabilization device according to an embodiment of the present disclosure.

REFERENCE SIGNS 1, housing; 11, upper cover; 111, top plate; 112, side plate; 12, base; 121, main board; 122, connecting pillar; 1221, metal piece; 123, second bearing platform; 1231, second rolling groove; 2, focusing structure; 21, bracket; 211, first connecting pin; 212, first boss; 2121, first connecting groove; 213, first bearing platform; 2131, first rolling groove; 214, through-hole; 22, lens barrel; 221, annular groove; 222, second boss; 221, second connecting groove; 223, connecting coil; 224, second connecting pin; 23, upper elastic sheet; 231, first upper connecting part; 232, second upper connecting part; 233, third upper connecting part; 234, first bending part; 235, second bending part; 236, connecting strip; 24, lower elastic sheet; 241, first lower connecting part; 242, second lower connecting part; 243, third bending part; 25, connecting block; 251, connecting protrusion; 30, image stabilization ball; 4, driving structure; 41, shared magnet; 42, driving coil; 43, image stabilization coil; 50, limiting space.

DESCRIPTION OF EMBODIMENTS

To better illustrate the present disclosure, the present disclosure will be described in the following with reference to the accompanying drawings. Preferred embodiments of the present disclosure are shown in the drawings. However, the present disclosure can be embodied in many different manners and thus is not limited to the embodiments described herein. Rather, these embodiments are provided merely for better illustrating the present disclosure.

It should be noted that when an element is referred to as being "fixed to" another element, it may be directly fixed to the other element or indirectly fixed to the other element through a medium element. When an element is considered to be "connected" to another element, it may be directly connected to the other element or indirectly connected to the other element through a medium element. As used herein, the terms "vertical", "horizontal", "left", "right" and similar expressions are for illustrative purposes only.

Unless otherwise defined, all technical and scientific terms used herein have the same meaning as commonly understood by those skilled in the art pertaining to the present disclosure. The terms used herein in the specification of the present disclosure is for the purpose of describing specific embodiments only, and is not intended to limit the present disclosure. As used herein, the term "and/or" includes any and all combinations of one or more associated listed items.

In an aspect, an embodiment of the present disclosure provides an optical image stabilization device that can be carried in mobile apparatus (such as a tablet computer and a mobile phone) and is for installing a lens having an optical axis, with automatic focusing and optical image stabilization functions. In an embodiment, referring to FIG. 1 and FIG. 2, the optical image stabilization device includes a housing 1, a focusing structure 2, an elastic connection structure, a driving structure 4, and image stabilization balls 30.

The housing 1 has a mounting space and provides a mounting environment, and other structures of the optical image stabilization device can be mounted to the housing 1.

The focusing structure 2 is arranged in the mounting space, and can move relative to the housing 1, including but not limited to: moving along an optical axis (the optical axis referring to an optical axis of the lens when being mounted, and being indicated by a dashed line in FIG. 1), and moving in a direction perpendicular to the optical axis. The elastic connection structure is connected between the focusing structure 2 and the housing 1, and the elastic connection structure is configured to enable the focusing structure 2 to have a movement trend toward a first side of the housing 1 along the optical axis in a free state. It should be noted that the first side of the housing 1 refers to a side along the optical axis, that is, if the focusing structure 2 moves along the optical axis, the focusing structure 2 can abut against the first side or form a gap from the first side.

The image stabilization balls 30 are arranged between the focusing structure 2 and the first side of the housing 1, and the image stabilization balls 30 are sandwiched between the focusing structure 2 and the first side of the housing 1 due to a movement trend, that is, the focusing structure 2 abuts against the image stabilization balls 30 due to a movement trend. The image stabilization balls 30 can roll in a plane perpendicular to the optical axis under an external force.

The driving structure 4 is arranged at the focusing structure 2 and the housing 1, and is configured to generate a driving force between the focusing structure 2 and the housing 1 to drive the focusing structure 2 to move and simultaneously roll the image stabilization balls 30, so that the focusing structure 2 moves in a direction perpendicular to the optical axis under a guidance of the image stabilization ball 30.

By providing the elastic connection structure, the focusing structure 2 can be connected to the housing 1, and the image stabilization balls 30 are provided between the focusing structure 2 and the first side of the housing 1. The elastic connection structure is configured to cause the focusing structure 2 to have a movement trend along the optical axis toward the first side of the housing 1, and the movement trend can cause the image stabilization balls 30 to be sandwiched between the focusing structure 2 and the housing 1, so that the focusing structure 2 abuts against the image stabilization balls 30. When the driving structure 4 drives the focusing structure 2 to move relative to the housing 1, since the image stabilization balls 30 can roll in a plane perpendicular to the optical axis under an external force, the focusing structure 2 can move in the direction perpendicular to the optical axis under the guidance of the image stabilization balls 30. With cooperation of the elastic connection structure and the image stabilization balls 30, a moving direction of the focusing structure 2 can be limited, so that the focusing structure 2 is not easy to move along a path not perpendicular to the direction of the optical axis when moving, thereby ensuring that the focusing structure 2 is not easy to tilt when moving, and thus ensuring an image stabilization effect. In addition, by arranging the image stabilization balls 30 between the focusing structure 2 and the housing 1 and cooperating with the elastic connection structure, the focusing structure 2 can be prevented from tilting during the movement the focusing structure 2, thereby achieving a simple structure with a compact structure of the whole image stabilization device, and reducing the production cost.

Figure 2:
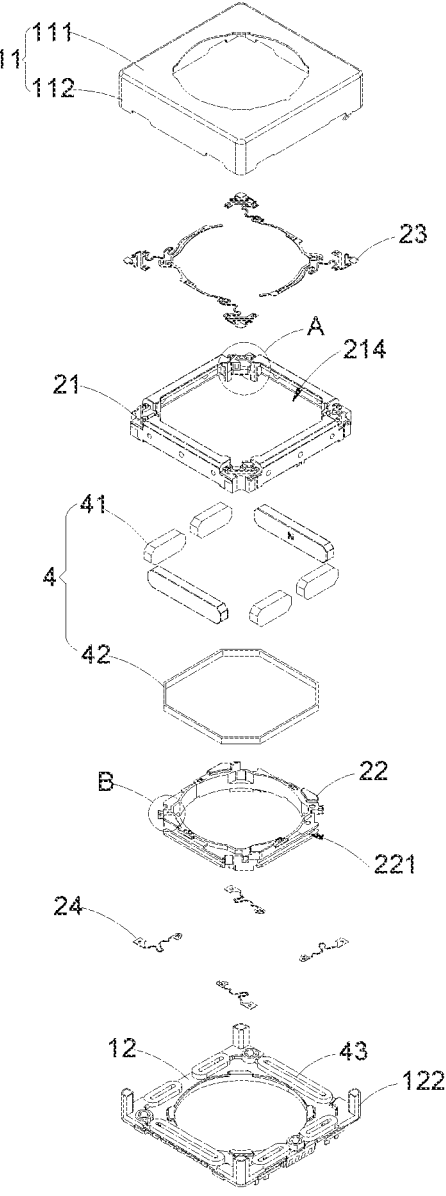
FIG. 2 shows an exploded view of an optical image stabilization device according to an embodiment of the present disclosure.
Figure 3:
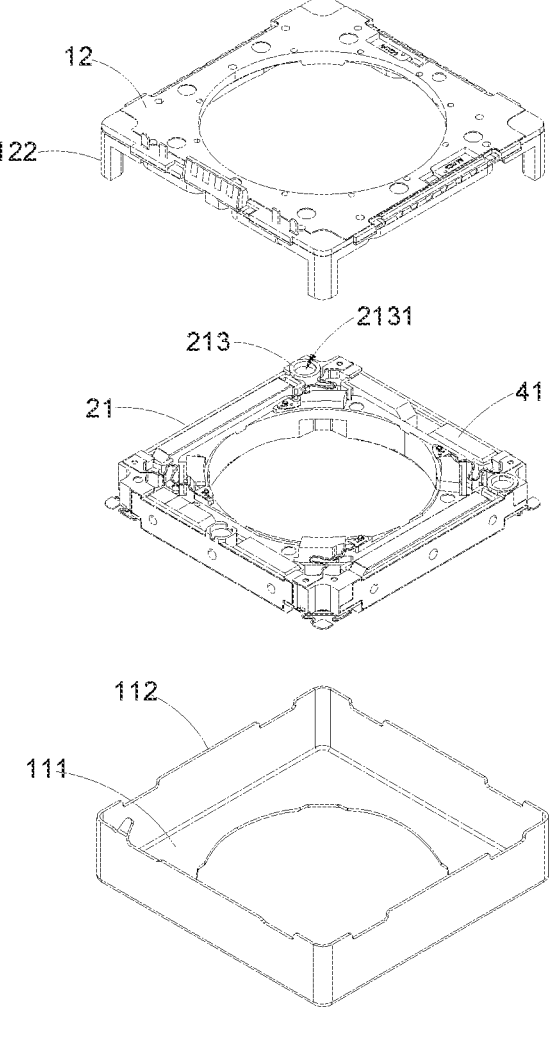
FIG. 3 shows another exploded view of an optical image stabilization device according to an embodiment of the present disclosure.
Figure 4:
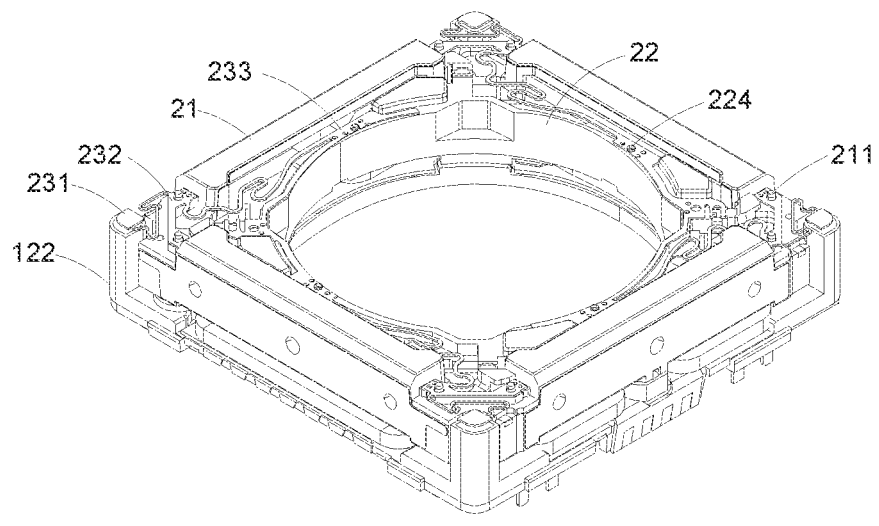
FIG. 4 shows a schematic structural diagram of an optical image stabilization device according to an embodiment of the present disclosure.

In an embodiment, referring to FIG. 1 and FIG. 2, the housing 1 is integrally formed as a rectangular shape, and includes an upper cover 11 and a base 12 that are detachably connected to each other. The upper cover 11 and the base 12 can be connected to each other by means of fastening, clamping or screw connection, which is not limited herein by the embodiments of the present disclosure.

The upper cover 11 includes a top plate 111 and four side plates 112 surrounding an edge of the top plate 111, the four side plates 112 are located at a same side of the top plate 111, and the base 12 can be connected to an end of the four side plates 112 away from the top plate 111. A mounting space is enclosed by the top plate 111, the four side plates 112 and the base 12. It should be noted that each of the top plate 111 and the base 12 is provided with a through-hole at a corresponding position, so that the lens can penetrate through the two through-holes.

It should be noted that the focusing structure 2 is connected to the base 12 through an elastic sheet. A gap is formed between the focusing structure 2 and the base 12, and a gap is formed between the focusing structure 2 and the top plate 111 and between the focusing structure 2 and the side plate 112, respectively. The elastic sheet has elastic deformation capability, and can make the focusing structure 2 move in a predetermined direction under a driving force of the driving structure 4. After the driving force is withdrawn, the original position cane be restored under an elastic force of the elastic sheet. The image stabilization balls 30 are arranged between the focusing structure 2 and the base 12 to support the focusing structure 2 on the base 12. It should be noted that the elastic connection structure may be a separate structure that connects the focusing structure 2 and the base 12, or may be a structure integrally formed with the elastic sheet. In other words, the elastic connection structure may be a part of the elastic sheet, so that the elastic sheet can exert a slightly pressure on the focusing structure 2 onto the image stabilization balls 30.

In an embodiment, referring to FIG. 1 to FIG. 5, an end of the focusing structure 2 facing the base 12 is provided with first bearing platforms 213 spaced from each other. An end surface of the first bearing platform 213 facing the base 12 does not exceed or slightly exceeds an end surface corresponding to the focusing structure 2, and an end of the first bearing platform 213 facing the base 12 is provided with a first rolling groove 2131.

A second bearing platform 123 is provided at an end of the base 12 facing the focusing structure 2 and at a position corresponding to the first bearing platform 213, and a second rolling groove 1231 corresponding to the first rolling groove 2131 is provided at a position of the second bearing platform 123. A gap is formed between the first bearing platform 213 and the second bearing platform 123 corresponding thereto. A limiting space 50 can be formed between the first bearing platform 213 and the second bearing platform 123 through the first rolling groove 2131 and the second rolling groove 1231, and the image stabilization ball 30 can be arranged in the limiting space 50.

It should be noted that a diameter of the image stabilization ball 30 is greater than a sum of depths of the first rolling groove 2131 and the second rolling groove 1231, but less than a width of the first rolling groove 2131 and a width of the second rolling groove 1231. A depth of the rolling groove refers to a size in a direction parallel to the optical axis, and a width of the rolling groove refers to a size in a direction perpendicular to the optical axis. The focusing structure 2 and the base 12 are provided with the first bearing platform 213 and the second bearing platform 123, and the first bearing platform 213 and the second bearing platform 123 are provided with the first rolling groove 2131 and the second rolling groove 1231, so that the image stabilization ball 30 can be limited in the limiting space 50 formed by the first rolling groove 2131 and the second rolling groove 1231.

It should be noted that a bottom of the first rolling groove 2131 and a bottom of the second rolling groove 1231 each can be provided with a spacer. The spacer has a smooth surface, and an end surface of the image stabilization ball 30 can abut against the spacer.

In an embodiment, referring to FIG. 4 to FIG. 8, the focusing structure 2 includes a bracket 21 and a lens barrel 22. An overall shape of the bracket 21 is formed as a rectangular shape, and a through-hole 214 is formed in the bracket 21. The through-hole 214 is formed as a rectangular shape, and the lens barrel 22 is arranged in the through-hole 214. A gap is formed between a side wall of the lens barrel 22 and an inner side wall of the bracket 21. It should be noted that a through-hole is also formed in the lens barrel 22. The through-hole in the lens barrel 22, the through-hole in the top plate 111 and the through-hole in the base 12 are all circular through-holes, circle centers of which are all located on the optical axis, so that the lens can penetrate through three through-holes.

The bracket 21 can be connected to the base 12 through an elastic sheet, and the lens barrel 22 can be connected to the bracket 21 through an elastic sheet. The elastic sheet includes an upper elastic sheet 23 and a lower elastic sheet 24. The upper elastic sheet 23 and the lower elastic sheet 24 are located at two opposite sides of the focusing structure 2 in the direction of the optical axis, and the upper elastic sheet 23 is made of a conductive material. In an example, four upper elastic sheets 23 and four lower elastic sheets 24 are provided. Partial structure of the upper elastic sheets 23 can be connected to the base 12, the bracket 21 and the lens barrel 22, respectively, and the lower elastic sheets 24 can be connected to the bracket 21 and the lens barrel 22, respectively.

For example, the upper elastic sheet 23 includes a first upper connecting part 231, a second upper connecting part 232 and a third upper connecting part 233. The first upper connecting part 231 and the second upper connecting part 232 are connected to each other by a first bending part 234, and the second upper connecting part 232 and the third upper connecting part 233 are connected to each other by a second bending part 235. Bending shapes of the first bending part 234 and the second bending part 235 are not limited herein. The bracket 21 is provided with a first connecting pin 211, and the lens barrel 22 is provided with a second connecting pin 224. The second upper connecting part 232 and the third upper connecting part 233 are provided with connecting holes (not shown) at positions corresponding to the connecting pins. The second upper connecting part 232 and the third upper connecting part 233 are connected to the first connecting pin 211 and the second connecting pin 224 through the connecting holes. The first upper connecting part 231 is connected to the base 12, so that the bracket 21 is connected to the base 12, and an end of the lens barrel 22 facing away from the base 12 is connected to the bracket 21.

It should be noted that each of the first bending part 234 and the second bending part 235 includes bending portions, and the bending portions are arranged along a path and are sequentially connected, so that each of the first bending part 234 and the second bending part 235 has a predetermined length. The first bending part 234 and the second bending part 235 are different in terms of a number and a bending direction of the bending portions.

The first upper connecting part 231, the second upper connecting part 232, and the third upper connecting part 233 are located in a same plane, and the first upper connecting part 231 is spaced from the second upper connecting part 232. The first bending part 234 is laterally arranged between the first upper connecting part 231 and the second upper connecting part 232, and two ends of the first bending part 234 are connected to the first upper connecting part 231 and the second upper connecting part 232, respectively. The lateral direction (i.e., laterally) herein can be illustrated as follows: in a plane where the three connecting parts are located, a direction from the first upper connecting part 231 to the second upper connecting part 232 is a vertical direction, and a direction perpendicular to the vertical direction is a lateral direction, meaning that a length direction of the first bending part 234 is perpendicular to the vertical direction.

The second upper connecting part 232 is spaced from the third upper connecting part 233, the second bending part 235 is obliquely arranged between the second upper connecting part 232 and the third upper connecting part 233, and two ends of the second bending part 235 are connected to the second upper connecting part 232 and the third upper connecting part 233, respectively. The oblique arrangement (i.e., obliquely) herein can be illustrated as follows: a length direction of the second bending part 235 forms an included angle with a direction from the second upper connecting part 232 toward the third upper connecting part 233. The included angle is not too large, preferably 0°, which needs to be determined according to actual conditions.

When the first upper connecting part 231 is connected to the base 12, a height of the first upper connecting part 231 in the direction of the optical axis is lower than a height of the other two connecting parts in the direction of the optical axis, so that the three connecting parts are not in a same plane. Since the height of the first upper connecting part 231 is lower, a bending part between the second upper connecting part 232 and the first upper connecting part 231 has a deformation. An elastic force generated by the deformation enables the second upper connecting part 232 to press the bracket 21 against the image stabilization balls 30, so that the bracket 21 is not easy to move in the direction of the optical axis.

It should be noted that among four upper elastic sheets 23, every two upper elastic sheets 23 can form a group, and the two upper elastic sheets 23 of one group are fixedly connected to each other through a connecting strip 236. Two ends of the connecting strip 236 are connected to the third upper connecting parts 233 of the two upper elastic sheets 23.

It should be noted that the lower elastic sheet 24 includes a first lower connecting part 241 and a second lower connecting part 242, and the first lower connecting part 241 and the second lower connecting part 242 are connected to each other through a third bending part 243. A shape of the third bending part 243 is not limited. The third bending part 243 has bending portions, which are sequentially connected to one another. An end of the bracket 21 facing the base 12 and an end of the lens barrel 22 facing the base 12 are provided with a first connecting pin 211 and a second connecting pin 224. The first lower connecting part 241 is fixedly connected to the first connecting pin 211 at the end of the bracket 21 facing the base 12, and the second lower connecting part 242 is fixedly connected to the second connecting pin 224 at the end of the lens barrel 22 facing the base 12. An end of the lens barrel 22 facing away from the base 12 is connected to an end of the bracket 21 facing away from the base 12 through the upper elastic sheet 23, and an end of the bracket 21 facing the base 12 is connected to an end of the lens barrel 22 facing the base 12 through the lower elastic sheet 24, so that the lens barrel 22 can be suspended in the through-hole 214.

In an embodiment, referring to FIG. 2, FIG. 9, FIG. 10, and FIG. 11, there are a plurality of connection positions between the bracket 21 and the lens barrel 22, and the bracket 21 and the lens barrel 22 can be connected at these connection positions. For example, first bosses 212 are formed at an inner side wall of the bracket 21 facing the lens barrel 22, and preferably, a respective one first boss 212 is formed at each of four corners of the bracket 21. A second boss is formed at an outer wall of the lens barrel 22 facing the first boss 212. When the lens barrel 22 is connected to the bracket 21, the first boss 212 is spaced from the corresponding second boss 222.

Opposite ends of the first boss 212 and the second boss 222 have a first connecting groove 2121 and a second connecting groove 2221 along the direction of the optical axis. The first connecting groove 2121 is opposite to the second connecting groove 2221, and a connecting block made of a damping material is arranged between the first connecting groove 2121 and the second connecting groove 2221. Two ends of the damping material are connected to the first boss 212 and the second boss 222, so that four corners of the bracket 21 and the lens barrel 22 are connected through the damping material.

In an embodiment, referring to FIG. 2, the driving structure 4 includes shared magnets 41 arranged at the inner wall of the bracket 21 and surrounding the lens barrel 22, and a driving coil 42 arranged at the lens barrel 22 and facing the shared magnets 41. Mounting grooves (not shown) are provided at the inner wall of the bracket 21, and the shared magnets 41 can be fixed in the mounting grooves. The lens barrel 22 is provided with an annular groove 221 around the outer side wall of the lens barrel 22. The driving coil 42 is annular and can be fixed in the annular groove 221 around the lens barrel 22. The driving coil 42 is opposite to an end of each of the shared magnets 41 facing the lens barrel 22.

It should be noted that the base 12 is provided with a main board 121, and the first upper connecting part 231 of the upper elastic sheet 23 can be connected to the main board 121. As mentioned above, two upper elastic sheets 23 can be connected as a whole. A structure for connecting the two upper elastic sheets 23 is made of a conductive material, and a part protruding from the structure can abut against the connecting coil 223. The connecting coil 223 is in communication with the driving coil 42. In this case, when the main board 121 is energized to the first upper connecting part 231, the driving coil 42 can be energized through the cooperation of the upper elastic sheet 23 and the connecting coil 223. The energized driving coil 42 can be subjected to an ampere force along the optical axis in a magnetic field of the shared magnets 41, thereby driving the lens barrel 22 to move along the optical axis.

It should be noted that the four corners of the base 12 are convexly provided with connecting pillars 122, which are located at an end of the base 12 facing the bracket 21. Each first upper connecting part 231 faces/is opposite to a respective one connecting pillar 122, and a gap is formed between a top end of the connecting pillar 122 and the first upper connecting part 231. A deepness of the gap depends on actual conditions. A metal piece 1221 is further embedded in the base 12. A portion of the metal piece 1221 corresponding to each connecting pillar 122 is arranged in the connecting pillar 122, with an end portion of the metal piece 1221 being exposed from a top end of the connecting pillar 122, and another end of the metal piece 1221 being connected to the main board 121. The first upper connecting part 231 can be welded to the metal piece 1221 corresponding to the connecting pillar 122. In this case, the main board 121 can control the current to flow to the first upper connecting part 231 through the metal piece 1221.

Figure 5:
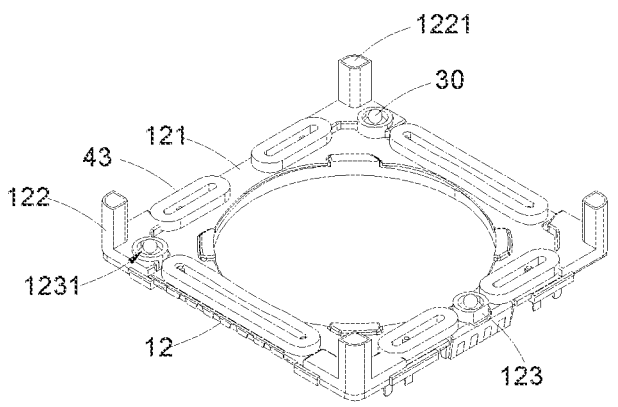
FIG. 5 shows a schematic structural diagram of a base according to an embodiment of the present disclosure.
Figure 6:
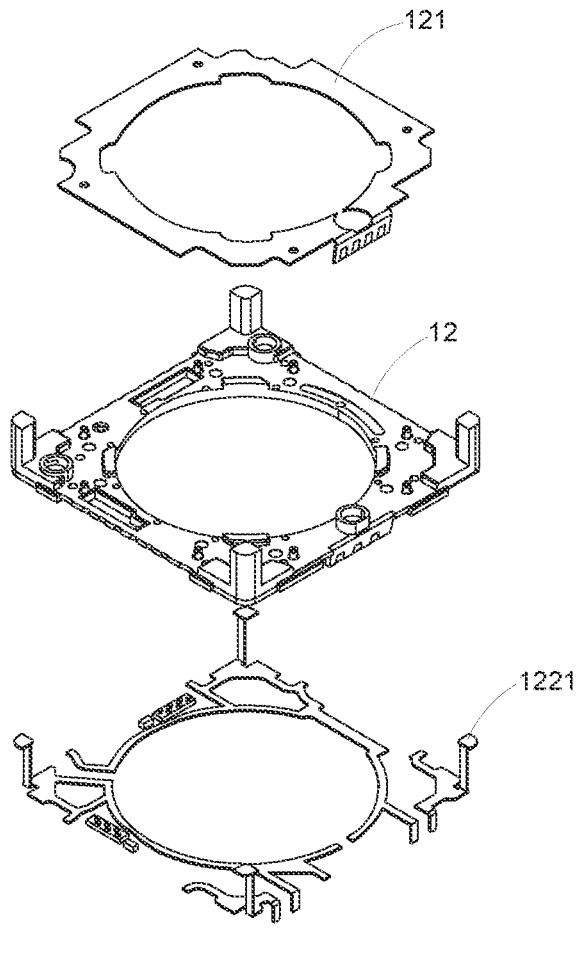
FIG. 6 shows an exploded view of a base according to an embodiment of the present disclosure.
Figure 7:
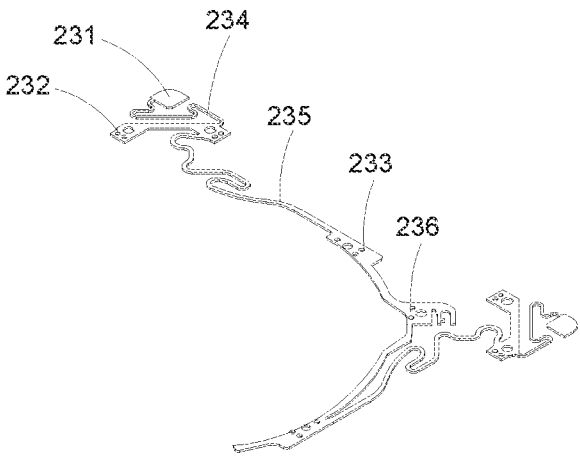
FIG. 7 shows a schematic structural diagram of an upper elastic sheet according to an embodiment of the present disclosure.
Figure 8:
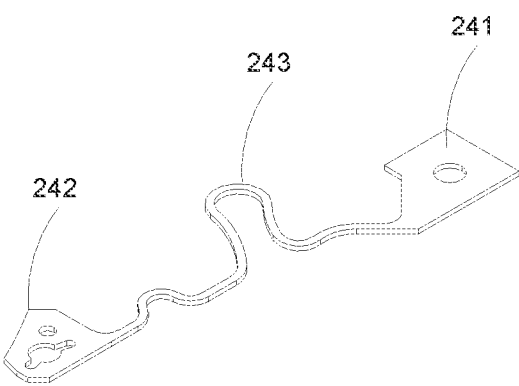
FIG. 8 shows a schematic structural diagram of a lower elastic sheet according to an embodiment of the present disclosure.
Figure 9:
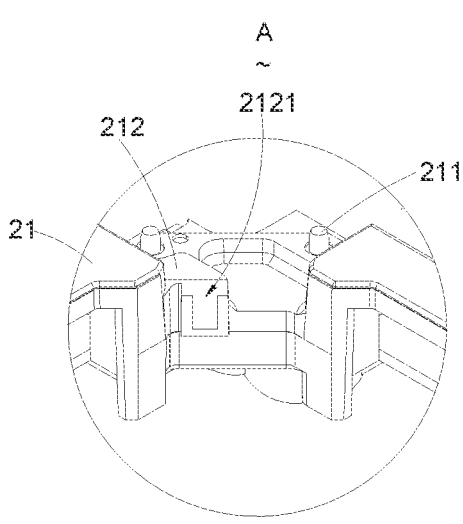
FIG. 9 is an enlarged view of part A shown in FIG. 2.
Figure 10:
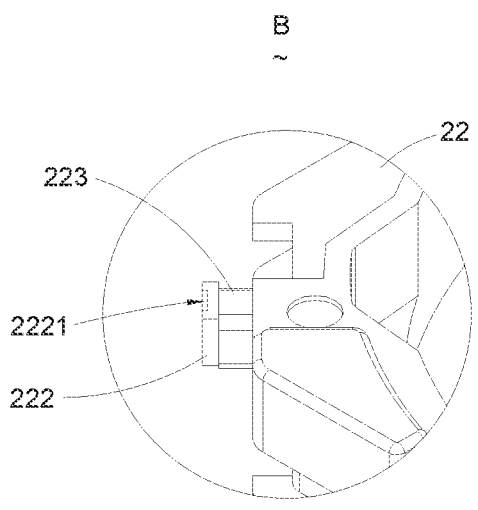
FIG. 10 is an enlarged view of part B shown in FIG. 2.
Figure 11:
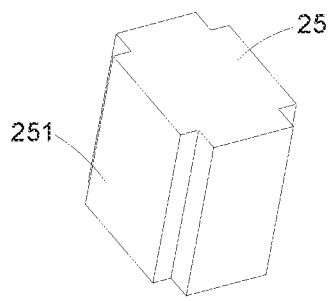
FIG. 11 shows a schematic structural diagram of a connecting block according to an embodiment of the present disclosure.

In an embodiment, referring to FIG. 5, the driving structure 4 further includes image stabilization coils 43 provided at the base 12. The image stabilization coils 43 can be fixed to the main board 121 and electrically connected to the main board 121. Positions of the image stabilization coils 43 on the main board 121 faces the shared magnets 41, so that the image stabilization coils 43 and the driving coil 42 can share the shared magnets 41. By providing the image stabilization coils 43, when the image stabilization coils 43 are energized, the image stabilization coils 43 are subjected to an ampere force perpendicular to the direction of the optical axis, and the shared magnets 41 are subjected to a counter-acting force. The bracket 21 can move in a direction perpendicular to the optical axis under the action of the counter-acting force.

In another aspect, an embodiment of the present disclosure provides an optical device, including the optical image stabilization device described above.

The various technical features of the above embodiments can be combined in any manners. In order to make the description concise, the present disclosure does not describe all possible combinations of the technical features in the above embodiments. However, as long as there is no conflict when combining these technical features, the combination shall be considered as falling to a scope of the present disclosure.

The above embodiments merely describe some rather than all of the embodiments of the present disclosure, and the described embodiments shall not be construed as limiting the scope of the present disclosure. It should be noted that those skilled in the art may make several modifications and improvements without departing from a concept of the present disclosure, and all of these modifications and improvements shall fall to a scope of the present disclosure. Therefore, the scope of the present disclosure shall be defined by the appended claims.

What is claimed is:

1. An optical image stabilization device, applicable to a lens having an optical axis and comprising:

a housing having a mounting space;

a focusing structure provided in the mounting space;

an elastic connection structure connected between the focusing structure and the housing and configured to enable the focusing structure to have a movement trend toward a first side of the housing in a direction of the optical axis in a free state; the elastic connection structure consists of elastic sheet, which comprising an upper elastic sheet and a lower elastic sheet arranged at two opposite sides of the focusing structure in the direction of the optical axis;

image stabilization balls provided between the focusing structure and the first side of the housing, wherein the image stabilization balls are sandwiched between the focusing structure and the first side of the housing due to the movement trend, and the image stabilization balls are capable of rolling in a plane perpendicular to the optical axis under an external force; and a driving structure provided at the focusing structure and the housing and configured to generate a driving force between the focusing structure and the housing to drive the focusing structure to move and simultaneously make the image stabilization balls roll, in such a manner that the focusing structure moves in a direction perpendicular to the optical axis under a guidance of the image stabilization balls;

wherein the focusing structure comprises a bracket and a lens barrel, a first boss is formed at each corner of an inner side wall of the bracket facing the lens barrel, and a second boss is formed at an outer wall of the lens barrel facing the first boss; both the first bosses and the second bosses are four in number; and opposite ends of the first boss and the second boss have a first connecting groove and a second connecting groove along the direction of the optical axis, the first connecting groove is opposite to the second connecting groove, and a connecting block made of a damping material is arranged between the first connecting groove and the second connecting groove; two ends of the damping material are connected to the first boss and the second boss, so that four corners of the bracket and the lens barrel are connected through the damping material.

2. The optical image stabilization device as described in claim 1, wherein the housing comprises an upper cover and a base detachably connected to each other, the mounting space is enclosed by the upper cover and the base, the focusing structure is connected to the base through the elastic sheet, a gap is formed between the focusing structure and the base, and the image stabilization balls are located between the focusing structure and the base.

3. The optical image stabilization device as described in claim 2, wherein an end of the focusing structure facing the base is provided with first bearing platforms spaced from one another, an end of each of the first bearing platforms facing the base is provided with a first rolling groove, an end of the base facing the focusing structure is provided with a second bearing platform at a position corresponding to each of the first bearing platforms, the second bearing platform is provided with a second rolling groove at a position corresponding to each of the first rolling grooves, to form a limiting space between each of the first bearing platforms and each of the second bearing platforms, and each of the image stabilization balls is arranged in the limiting space.

4. The optical image stabilization device as described in claim 2, wherein the driving structure comprises shared magnets arranged in the focusing structure, a main board is arranged at the base, and the main board is connected to an image stabilization coil at a position corresponding to each of the shared magnets.

5. The optical image stabilization device as described in claim 4, wherein the bracket comprises a through-hole, the lens barrel is movably disposed in the through-hole along the direction of the optical axis, a partial structure of the upper elastic sheet is connected to each of the base, the bracket, and the lens barrel, and the lower elastic sheet is connected to the bracket and the lens barrel.

6. The optical image stabilization device as described in claim 5, wherein the upper elastic sheet comprises a first upper connecting part, a second upper connecting part and a third upper connecting part, and wherein the first upper connecting part and the second upper connecting part are connected to each other through a first bending part, the second upper connecting part and the third upper connecting part are connected to each other through a second bending part, the bracket is provided with a first connecting pin, the lens barrel is provided with a second connecting pin, the second upper connecting part and the third upper connecting part are connected to the first connecting pin and the second connecting pin, and the first upper connecting part is connected to the base.

7. The optical image stabilization device as described in claim 6, wherein the lower elastic sheet comprises a first lower connecting part and a second lower connecting part, and wherein the first lower connecting part and the second lower connecting part are connected to each other through the second bending part, the first lower connecting part is fixedly connected to the bracket, and the second lower connecting part is fixedly connected to the lens barrel.

8. The optical image stabilization device as described in claim 5, wherein the elastic sheet comprises four upper elastic sheets and four lower elastic sheets, two of the four upper elastic sheets form a group, and the two upper elastic sheets in a same group are connected through a connecting strip to integrally form a whole.

9. The optical image stabilization device as described in claim 1, wherein the shared magnets are arranged at an inner wall of the bracket and around the lens barrel, the driving structure comprises a driving coil arranged at the lens barrel and facing the shared magnets, the main board is arranged at the base, and the upper elastic sheet is connected to the main board and the driving coil.

10. The optical image stabilization device as described in claim 9, wherein a metal piece electrically connected to the main board is embedded in the base, and the upper elastic sheet is welded to the metal piece.

11. An optical device, comprising an optical image stabilization device, wherein the optical image stabilization device is applicable to a lens having an optical axis and comprises:

a housing having a mounting space;

a focusing structure provided in the mounting space;

an elastic connection structure connected between the focusing structure and the housing and configured to enable the focusing structure to have a movement trend toward a first side of the housing in a direction of the optical axis in a free state; the elastic connection structure consists of elastic sheet, which comprising an upper elastic sheet and a lower elastic sheet arranged at two opposite sides of the focusing structure in the direction of the optical axis;

image stabilization balls provided between the focusing structure and the first side of the housing, wherein the image stabilization balls are sandwiched between the focusing structure and the first side of the housing due to the movement trend, and the image stabilization balls are capable of rolling in a plane perpendicular to the optical axis under an external force; and a driving structure provided at the focusing structure and the housing and configured to generate a driving force between the focusing structure and the housing to drive the focusing structure to move and simultaneously make the image stabilization balls roll, in such a manner that the focusing structure moves in a direction perpendicular to the optical axis under a guidance of the image stabilization balls;

wherein the focusing structure comprises a bracket and a lens barrel, a first boss is formed at each corner of an inner side wall of the bracket facing the lens barrel, and a second boss is formed at an outer wall of the lens barrel facing the first boss; both the first bosses and the second bosses are four in number; and opposite ends of the first boss and the second boss have a first connecting groove and a second connecting groove along the direction of the optical axis, the first connecting groove is opposite to the second connecting groove, and a connecting block made of a damping material is arranged between the first connecting groove and the second connecting groove; two ends of the damping material are connected to the first boss and the second boss, so that four corners of the bracket and the lens barrel are connected through the damping material.

* * * * *